US009361277B2

(12) United States Patent
Qu et al.

(10) Patent No.: US 9,361,277 B2
(45) Date of Patent: Jun. 7, 2016

(54) METHOD AND APPARATUS FOR IMPLEMENTING MICROBLOG MESSAGE PAGES

(71) Applicant: TENCENT TECHNOLOGY (SHENZHEN) COMPANY LIMITED, Shenzhen (CN)

(72) Inventors: Lei Qu, Shenzhen (CN); Xiuxing Du, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 490 days.

(21) Appl. No.: 13/745,758

(22) Filed: Jan. 19, 2013

(65) Prior Publication Data

US 2013/0132828 A1 May 23, 2013

Related U.S. Application Data

(63) Continuation of application No. PCT/CN2011/080750, filed on Oct. 13, 2011.

(51) Int. Cl.
*G06F 17/00* (2006.01)
*G06F 17/21* (2006.01)
*G06Q 10/10* (2012.01)

(52) U.S. Cl.
CPC .............. *G06F 17/211* (2013.01); *G06Q 10/10* (2013.01)

(58) Field of Classification Search
None
See application file for complete search history.

(56) References Cited

U.S. PATENT DOCUMENTS

| 2006/0047743 A1* | 3/2006 | Yuan et al. ................... 709/203 |
| 2008/0094369 A1* | 4/2008 | Ganatra et al. ............... 345/173 |
| 2009/0006318 A1 | 1/2009 | Lehtipalo et al. |
| 2012/0101806 A1* | 4/2012 | Davis et al. ...................... 704/9 |

FOREIGN PATENT DOCUMENTS

| CN | 1658149 A | 8/2005 |
| CN | 101310271 A | 11/2008 |
| CN | 101410782 A | 4/2009 |

OTHER PUBLICATIONS

The World Intellectual Property Organization (WIPO) International Search Report for PCT/CN2011/080750 Oct. 13, 2011.
The State Intellectual Property Office of the People's Republic of China (SIPO) Office Action 1 for 2010-10518413.0 Aug. 6, 2013.

* cited by examiner

*Primary Examiner* — Keith Bloomquist
(74) *Attorney, Agent, or Firm* — Anova Law Group, PLLC (57) ABSTRACT

Various embodiments provide methods and apparatus for implementing a microblog message page. An exemplary method can include encapsulating common logics of a plurality of message pages into a message page control base, pulling content data of a message page control of one message page of the plurality of message pages; and enabling the message page control of the one message page to inherit from the common logics encapsulated in the message page control base. The exemplary method can also include executing the common logics based on the pulled content data, to load the message page control of the one message page and to display the message page control on the one message page. The disclosed methods and apparatus can simplify the sorting algorithm with improved efficiency for the message pages to sort and manage layout of various types of controls.

11 Claims, 9 Drawing Sheets

METHOD AND APPARATUS FOR IMPLEMENTING MICROBLOG MESSAGE PAGES

CROSS-REFERENCES TO RELATED APPLICATIONS

This application claims the priority to International Application No. PCT/CN2011/080750, filed on Oct. 13, 2011, which claims priority to Chinese Patent Application No. CN201010518413.0, filed on Oct. 18, 2010, the entire contents of all of which are incorporated herein by reference.

FIELD OF THE DISCLOSURE

The present disclosure relates to the field of computer network communication technology and, more particularly, relates to methods and apparatus for implementing microblog message pages.

BACKGROUND

Instant messaging (IM) has become a necessity for social networking and communications. IM users require IM software with high level of usability, stability, and security. Currently, IM software mainly support a one-to-one chatting/messaging mode, and one-to-many group chatting/messaging mode.

Microblog, as an extension of IM messaging propagation mechanism, has been rapidly developed. Microblog users can generally use about 140 words to express themselves. These messages can then be quickly spread, which enables messaging/chatting mode extending from one-to-one, one-to-many, to one-to-infinite. Based on their contents, microblog message pages may be categorized into various types, as shown in Table 1.

TABLE 1

| Content Type | Notes |
| --- | --- |
| Microblog Message | This is a core element of the microblog products - the content posted by users may sometimes include additional information. |
| "Message pulling" information | When the user's operation triggers the logic of pulling message from the server, the "Message pulling" status should be prompted to the user before completion of the message pulling. |
| "Fault" information | Pulling operation is usually conducted on a batch basis according to an order of posting times of the microblog messages. There is an upper limit for the number of messages that can be pulled each time. Fault conditions occur when there is no overlapping on microblog posting time between adjacent pulling batches. This means some messages may exist between the adjacent pulling batches without being pulled. Then, a "Fault" message should be prompted to the user. |
| "Upper Limit" information | If the total message number of current message page is checked to exceed the allowed maximum number after completion of a message pulling operation, it should be prompted to the user that the upper limit is reached. |
| "Other" information | Depending on application scenarios, some "other information" may be displayed on the microblog message page. For example, when entering a user's message page, the user's profile information may be displayed in addition to the microblog messages. |

Different types of content are encapsulated into different interface controls. Microblog message page is then a container of controls and may function mainly on constructing, destructing, and sorting and managing layout of the controls in the message page.

However, constructing or destructing message page controls are often coupled with message updating logic for specific application scenarios, which affects reusability. For example, a home page may display messages posted by the owner/self and messages posted by other people the owner follows. A guest page may only display messages posted by a particular guest. Because the message sources for the home page and the guest page are different, two sets of message pulling (updating) mechanisms must be developed. Currently, the message pulling (updating) logic is coupled with the display logic. After the messages have been pulled, the home page and the guest page have to develop their own logics to display the messages according to the pulled information. In addition, during the sorting and managing layout of a message page, the sorting algorithm first performs sorting based on control types and then based on the posting time of the microblog messages. The sorting algorithm is very complex and provides poor performance.

BRIEF SUMMARY OF THE DISCLOSURE

The disclosed embodiments can include methods and apparatus for implementing a microblog message page to simplify sorting algorithm, with improved efficiency for the message page to sort and control layout of all types of controls.

According to various embodiments, there is provided a method for implementing a microblog message page by encapsulating a common logic of a plurality of message pages in a message page control base; pulling content data of a message page control of one of the plurality of message pages; and enabling the message page control of the one of the plurality of message pages to inherit from the common logics encapsulated in the message page control base. The method can further include executing the common logic based on the pulled content data, to load the message page control of the one of the plurality of message pages and to display the message page control on the one of the plurality of message pages.

According to various embodiments, there is provided an apparatus for implementing a microblog message page. The apparatus can include: a message page control base module configured to encapsulate a common logic of a plurality of message pages into a message page control base; a control data pulling module configured to pull a content data of a message page control of one of the plurality of message pages; and a message page control module configured to enable the message page control of the one of the plurality of message pages to inherit the common logic encapsulated in the message page control base and to execute the common logics, wherein the message page control module includes a loading unit configured to load the message page control of the one of the plurality of message pages based on the pulled content data; and a display unit configured to display the message page control of the one of the plurality of message pages onto the one of the plurality of message pages.

In various embodiments, by encapsulating common logic of message pages in a message page control base and enabling each message page control to inherit from the common logic, new types of message pages can be easily added and managed by a unified management class. Expandability and maintainability of the code architecture along with development efficiency of message pages can be highly improved.

Other aspects or embodiments of the present disclosure can be understood by those skilled in the art in light of the description, the claims, and the drawings of the present disclosure.

BRIEF DESCRIPTION OF THE DRAWINGS

The following drawings are merely examples according to the disclosed embodiments.

DETAILED DESCRIPTION

Reference will now be made in detail to exemplary embodiments of the disclosure, which are illustrated in the accompanying drawings. Wherever possible, the same reference numbers will be used throughout the drawings to refer to the same or like parts.

Microblogs, as an extension of IM messaging propagation mechanism, may display various types of message pages as the most important function. Message pages may include, for example, a home page, a guest page, and/or an @ message page. In addition to these types of message pages, as microblog applications continue to expand, suitable page types are emerging including, for example, a broadcasting hall message page, a topic message page, a broadcasting syndication message page, a geographic location syndication message page, a dialog message page, etc. For these message pages, there is a need to provide technical solutions that can be used to quickly add and/or quickly develop new types of message pages. Management and maintainability of multi-type message pages can then be improved.

As disclosed, a technique for effectively improving expandability of message pages is provided. For example, common logics of all types of message pages can be encapsulated in a base class of a message page control base for implementation. Message page controls can be implemented by inheriting from and reusing the base class. By this technique, new types of message pages can be easily added and managed by this unified management class. Expandability and maintainability of the code architecture can be highly improved. Development efficiency can also be highly improved. Base on the above concept, examples will be given in great details as the following for those skilled in the art to understand.

Figure 8:
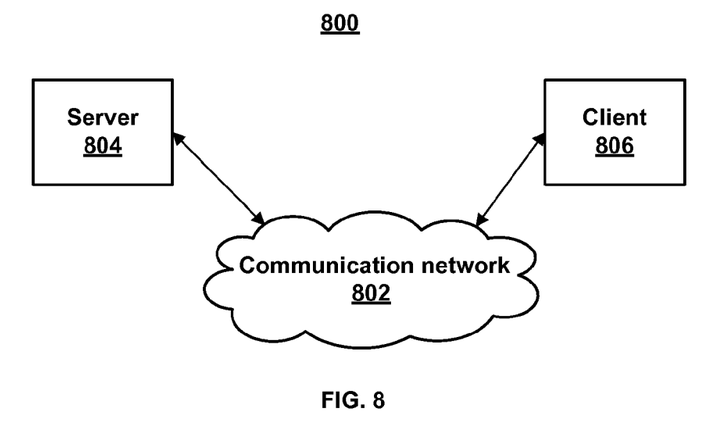
FIG. 8 depicts an exemplary environment incorporating certain disclosed embodiments.

FIG. 8 depicts an exemplary environment 800 incorporating certain disclosed embodiments. As shown in FIG. 8, environment 800 may include a server 804, a client 806, and a communication network 802. The server 804 and the client 806 may be coupled through the communication network 802 for information exchange, such as IM (e.g., microblog) communication. Although only one client 806 and one server 804 is shown in the environment 800, any number of clients 806 or servers 804 may be included, and other devices may also be included.

Communication network 802 may include any appropriate type of communication network for providing network connections to the server 804 and client 806 or among multiple servers 804 or clients 806. For example, communication network 802 may include the Internet or other types of computer networks or telecommunication networks, either wired or wireless.

A client, as used herein, may refer to any appropriate user terminal with certain computing capabilities, such as a personal computer (PC), a work station computer, a server computer, a hand-held computing device (tablet), a smart phone or mobile phone, or any other user-side computing device.

A server, as used herein, may refer one or more server computers configured to provide certain server functionalities, such as database management and search engines. A server may also include one or more processors to execute computer programs in parallel.

Figure 9:
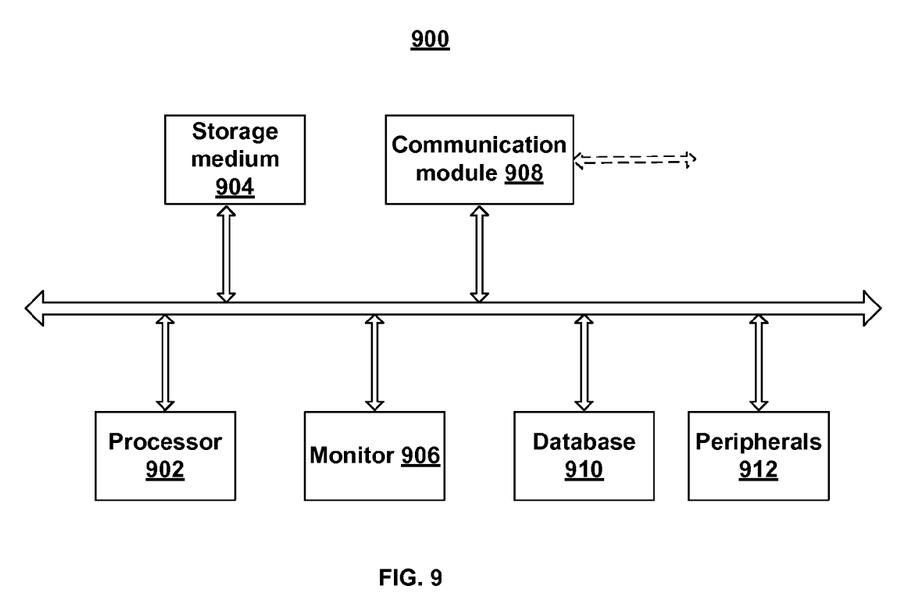
FIG. 9 depicts a block diagram of an exemplary computer system in accordance with various disclosed embodiments.

Server 804 and/or client 806 may be implemented on any appropriate computing platform. FIG. 9 shows a block diagram of an exemplary computer system 900 capable of implementing server 904 and/or client 906.

As shown in FIG. 9, computer system 900 may include a processor 902, a storage medium 904, a monitor 906, a communication module 908, a database 910, and/or peripherals 912. Certain devices may be omitted and other devices may be included.

Processor 902 may include any appropriate processor or processors. Further, processor 902 can include multiple cores for multi-thread or parallel processing. Storage medium 904 may include memory modules, such as ROM, RAM, flash memory modules, and erasable and rewritable memory, and mass storages, such as CD-ROM, U-disk, and hard disk, etc. Storage medium 904 may store computer programs for implementing various processes, when executed by processor 902. For example, microblog message system can be installed on the server storage medium 904.

Further, peripherals 912 may include I/O devices such as keyboard and mouse, and communication module 908 may include network devices for establishing connections through the communication network 902. Database 910 may include one or more databases for storing certain data and for performing certain operations on the stored data, such as database searching. For example, microblog messages can be stored in the database 910. When microblog server receives a request from client for pulling microblog messages, the microblog server can retrieve corresponding microblog messages from the database 910 and send the microblog messages to client.

Figure 1:
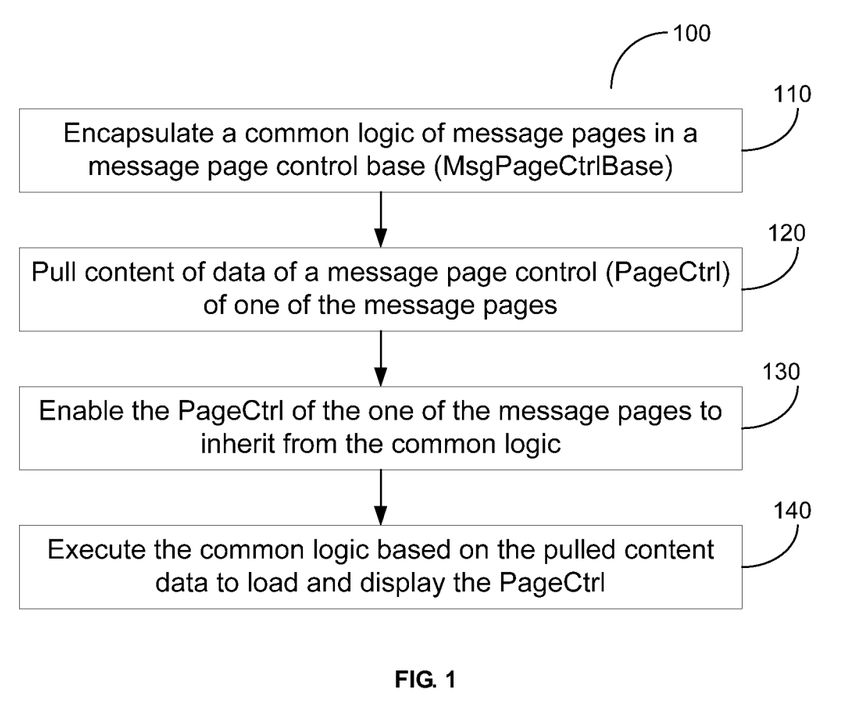
FIG. 1 depicts a schematic flow diagram illustrating an exemplary method for implementing a microblog message page in accordance with various disclosed embodiments.

In operation, e.g., IM (or microblog) data processing, server 904 and/or client 906 may perform certain data storage processes to facilitate storing data and querying data. FIG. 1 depicts an exemplary method 100 for implementing a microblog message page in accordance with various disclosed embodiments. Referring to FIG. 1, method 100 can include the followings.

In Step 110, common logics of various types of message pages can be encapsulated in a message page control base. Specifically, in this step, to facilitate expansion of various types of message pages, common logics of various types of message pages can be encapsulated in a message page control base (MsgPageCtrlBase). As disclosed herein, the common logics may include one or more of the following: (1) loading a control based on the pulled content data; (2) sorting various types of controls of the current message page; and (3) managing interface or page layout based on the sorted results and the size of those controls. For example, common logics may include logics applied to controls used by majority of microblog message pages. Exemplary controls may include message item control (MsgItemCtrl), loading item control (LoadingItemCtrl), more item control (MoreItemCtrl), fault item control (FaultItemCtrl), etc. In addition, some message pages may further include specific controls, for example, a control to display guest profile in a guest page. These controls can be loaded by dedicated logic(s).

Various types of controls are designed and disclosed herein, with respect to the microblog message page and suitable content types that may be present on the microblog message page. Table 2 lists exemplary types of controls of the message pages.

TABLE 2

| Control Type | Content Type | Notes |
| --- | --- | --- |
| Message item control (MsgItemCtrl) | Microblog message | MsgItemCtrl is used to display a microblog message and additional information. |
| Loading item control (LoadingItemCtrl) | Status information indicating "Pulling Message" | On a LoadingItemCtrl, an animation of "Loading" is displayed. The animation is prompted when pulling of a batch of messages starts. The animation disappears after the pulling is completed. The pulled messages are inserted into the original position for displaying of the LoadingItemCtrl. |
| Fault item control (FaultItemCtrl) | Fault information | When "Fault" occurs, a FaultItemCtrl is inserted between adjacent MsgItemCtrls. On the FaultItemCtrl, a picture and an indication note about the fault information is prompted. |
| More item control (MoreItemCtrl) | Upper limit information | MoreItemCtrl is displayed when the number of MsgItemCtrls reaches or exceeds the upper limit of the message page. MoreItemCtrl is displayed only at the bottom of the message page and only one MoreItemCtrl is allowed. |
| Other item control (OtherItemCtrl) | Other information | OtherItemCtrl is only displayed at the top of message page. Only one OtherItemCtrl is allowed. |
| Message page control (PageCtrl) | Corresponding to the entire microblog message page | PageCtrl is a container of all above-mentioned controls. According to the sorting rules, all item controls (ItemCtrls) are aligned in a vertical direction. MoreItemCtrl is displayed only at the bottom. OtherItemCtrl is displayed only at the top. |

In Step 120, content data of a message page control of one message page of various message pages (e.g., including various types of message pages such as a home page, a guest page, an @ message page, a broadcasting hall message page, a topic message page, a broadcasting syndication message page, a geographic location syndication message page, a dialog message page, etc., and/or multiple message pages thereof) can be pulled. For example, according to the pulling logic, each message page can pull content data that need to be displayed by the message page control (PageCtrl).

In Step 130, PageCtrl of the one message page of various message pages can be enabled to inherit from the common logics. In this step, the message pages at different application scenarios only need to inherit from the message page control base (MsgPageCtrlBase) to reuse the common logics, thus to improve reusability.

In Step 140, the common logics can be executed based on the pulled content data to load the message page control of the one message page and to display the message page control thereon. At this step 140, because the PageCtrl inherits common logics and functions thereof, the PageCtrls of various message pages can execute the inherited common logics to load and display all controls on the message page, according to the pulled content data. For example, a PageCtrl can use inherited common logic to load at least one MsgItemCtrl, at least one LoadngItemCtrl, at least one FaultItemCtrl and/or MoreItemCtrl and then display these controls on the message page. Of course, various embodiments are not limited to these controls.

Figure 2:
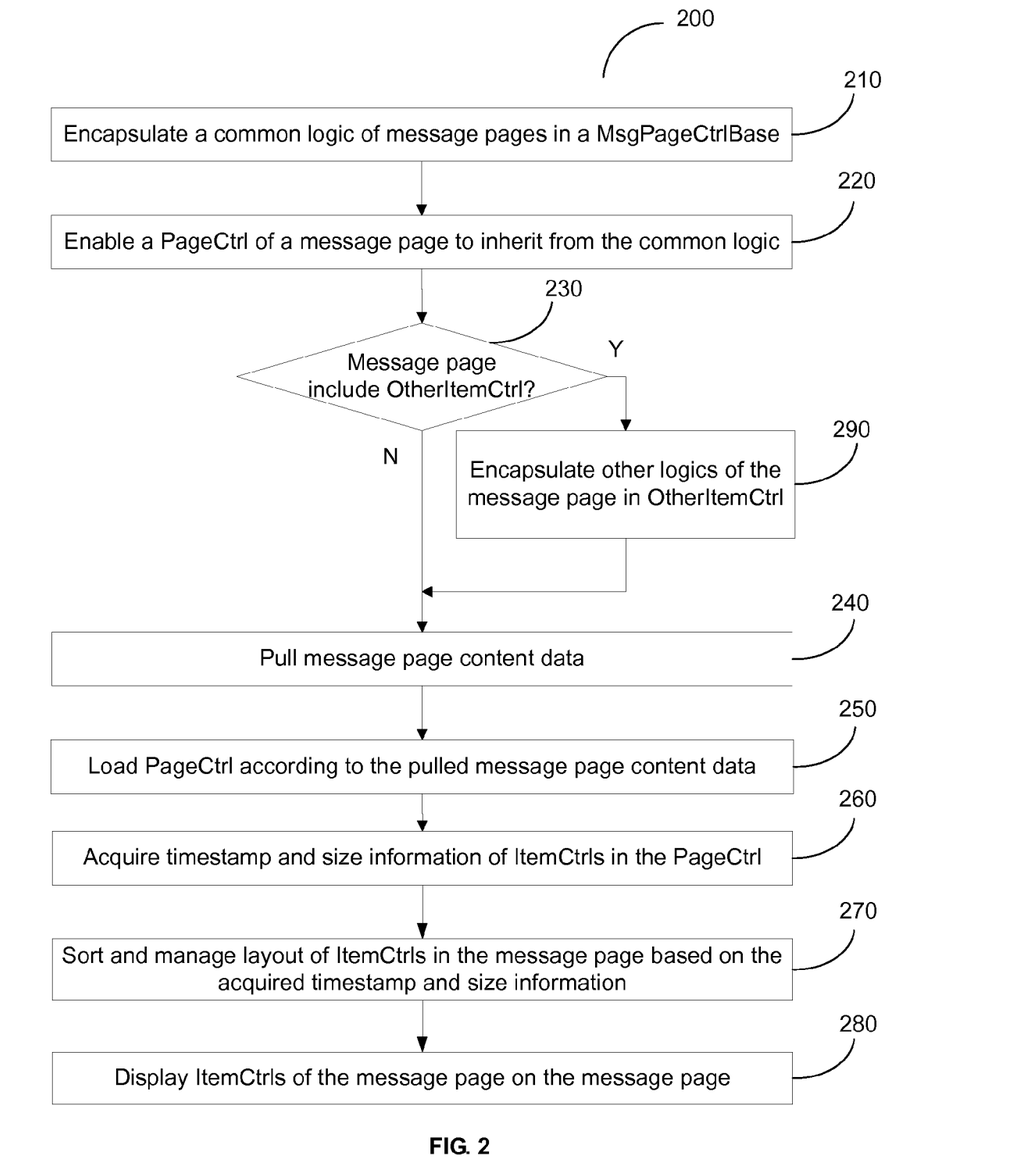
FIG. 2 depicts a schematic flow diagram illustrating another exemplary method for implementing a microblog message page in accordance with various disclosed embodiments.

FIG. 2 depicts another exemplary method 200 for implementing a microblog message page in accordance with various disclosed embodiments. Referring to FIG. 2, the method 200 may include the followings.

In Step 210, common logics of various message pages can be encapsulated in a message page control base. In Step 220, PageCtrl of a message page can be enabled to inherit from the common logics from message page control base.

In Step 230, it is determined whether the message page includes other control (OtherItemCtrl). When it is determined that the message page include other item control (OtherItemCtrl), the method 200 continues from Step 290. On the other hand, when it is determined that the message page does not include OtherItemCtrl, the method 200 continues to Step 240. A dedicated logic may be required for loading and displaying the OtherItemCtrl. As used herein, such dedicated logic can be referred as other logic.

Further, in Step 240, message page content data can be pulled. For example, the message page content data can be pulled by executing pulling (updating) logic of the message page.

In Step 250, PageCtrl can be loaded according to the pulled message page content data. In this step, loading logic of PageCtrl from the inherited common logics and loading logic from other logic can be executed to encapsulate message page content data into PageCtrl.

In Step 260, timestamp and size information of all controls in PageCtrl can be acquired. For example, if a message page does not include any controls other than the inherited common controls, PageCtrl can acquire timestamp and size information of, e.g., at least one MsgItemCtrl, at least one LoadingItemCtrl, at least one FaultItemCtrl and/or MoreItemCtrl by a public interface of the PageCtrl of various message pages. In one embodiment, if the message page includes OtherItemCtrl, the PageCtrl can further acquire timestamp and size information of the OtherItemCtr. PageCtrl of the message page can be responsible for loading, sorting, and/or managing layout of various types of item controls. As such, PageCtrl needs to obtain timestamp information used for sorting and/or size information used for managing layout from all loaded item controls.

In various embodiments, a common interface can be abstracted from various controls loaded in the PageCtrl and implemented as a public interface of the message page control. This common interface can provide methods for PageCtrl to obtain/acquire timestamp and size information of each control loaded in the PageCtrl.

In Step 270, all controls in a message page can be sorted and laid out, based on the acquired timestamp and size information. In one embodiment, if a message page does not include OtherItemCtrl, the PageCtrl can sort and manage layout for the at least one MsgItemCtrl, the at least one LoadingItemCtrl, the at least one FaultItemCtrl, and/or the MoreItemCtrl page, based on the acquired timestamp and size information. In another embodiment, if the message page includes otherItemCtrl, the PageCtrl can also conduct sorting and manage layout for the otherItemCtrl at the same time.

In various embodiments, a sorting rule for each control in a message page can be based on the order of timestamps. In microblog PageCtrl, each item control (ItemCtrl) can be aligned vertically. Among them, microblog MsgItemCtrl can be a major ItemCtrl, and each microblog message has a timestamp. MsgItemCtrls can be sorted according to the timestamps. The most recent MsgItemCtrl can be displayed at the top of the message page.

For example, the message timestamp (year/month/day/hour/minute/second) can be translated into an unsigned 32-bit integer value in seconds. The greater the integer value, the more recent the timestamp is, meaning the message is more current. Therefore, the messages on the message page can be sorted simply by the timestamp only.

Further, the timestamp for LoadingItemCtrl and/or FaultItemCtrl can be determined by the timestamp of adjacent ItemCtrl. The timestamp for MoreItemCtrl can be set to 0 (a normal message timestamp cannot be 0), because the MoreItemCtrl can only be displayed at the bottom of a message page. The timestamp for OtherItemCtrl can be set to 4294967295 [i.e., ($2^{32}$–1), according to conversion rules a normal message timestamp is always less than ($2^{32}$–1)], because the OtherItemCtrl can only be displayed at the top of a message page. Of course, various embodiments are not limited, as long as the timestamps of OtherItemCtrl and/or MoreItemCtrl do not conflict with the timestamp of MsgItemCtrl.

In this manner, all controls in the message page can be sorted by the value of corresponding timestamps. The controls can be laid out from top to bottom in a vertical direction according to corresponding timestamps, e.g., in a descending or ascending order.

In another embodiment, each control in the message page can have equal width. In page layout arrangement, layout position of each control can be determined by obtaining their height information in the order of from top to bottom. Of course, the layout is not limited according to various embodiments.

In another embodiment, OtherItemCtrl can be set to have a maximum timestamp and MoreItemCtrl can be set to have a minimum timestamp. While MsgItemCtrl can be set that the more recent the message is posted, the greater the timestamp. In addition, timestamps for LoadingItemCtrl and FaultItemCtrl can be determined by an adjacent ItemCtrl such as MsgItemCtrl.

In Step 280, all controls of the message page can be displayed on the message page. If a message page does not include OtherItemCtrl, the message page controls (PageCtrls) of one of various message pages can be displayed on this one message page. If a message page includes OtherItemCtrl, the OtherItemCtrl can also be displayed on the one message page of the various message pages.

In Step 290, other logics of the message page are encapsulated in the OtherItemCtrl. For example, other logics of the one message page of the various message pages can be encapsulated in the OtherItemCtrl of the one message page. Afterwards, the method 200 continues from Step 240.

In various embodiments, the method disclosed herein is not limited to any particular sequences between the step 250 and the step 280. In other words, the steps of loading, sorting, managing layout, and displaying of controls can be performed simultaneously or one or more steps can be altered, out of order, or omitted as desired.

In various embodiments, the method may further include: encapsulating various management logics in a corresponding management control. PageCtrl can respectively manage at least one MsgItemCtrl, at least one LoadingItemCtrl and/or at least one FaultItemCtrl through a corresponding management control. For example, three different types of LoadingItemCtrls can be presented, or simultaneously presented, on a message page. A specific management control can be added between the LoadingItemCtrl and the MsgPageCtrlBase to manage LoadingItemCtrl and to handle logics for these LoadingItemCtrls.

Figure 3:
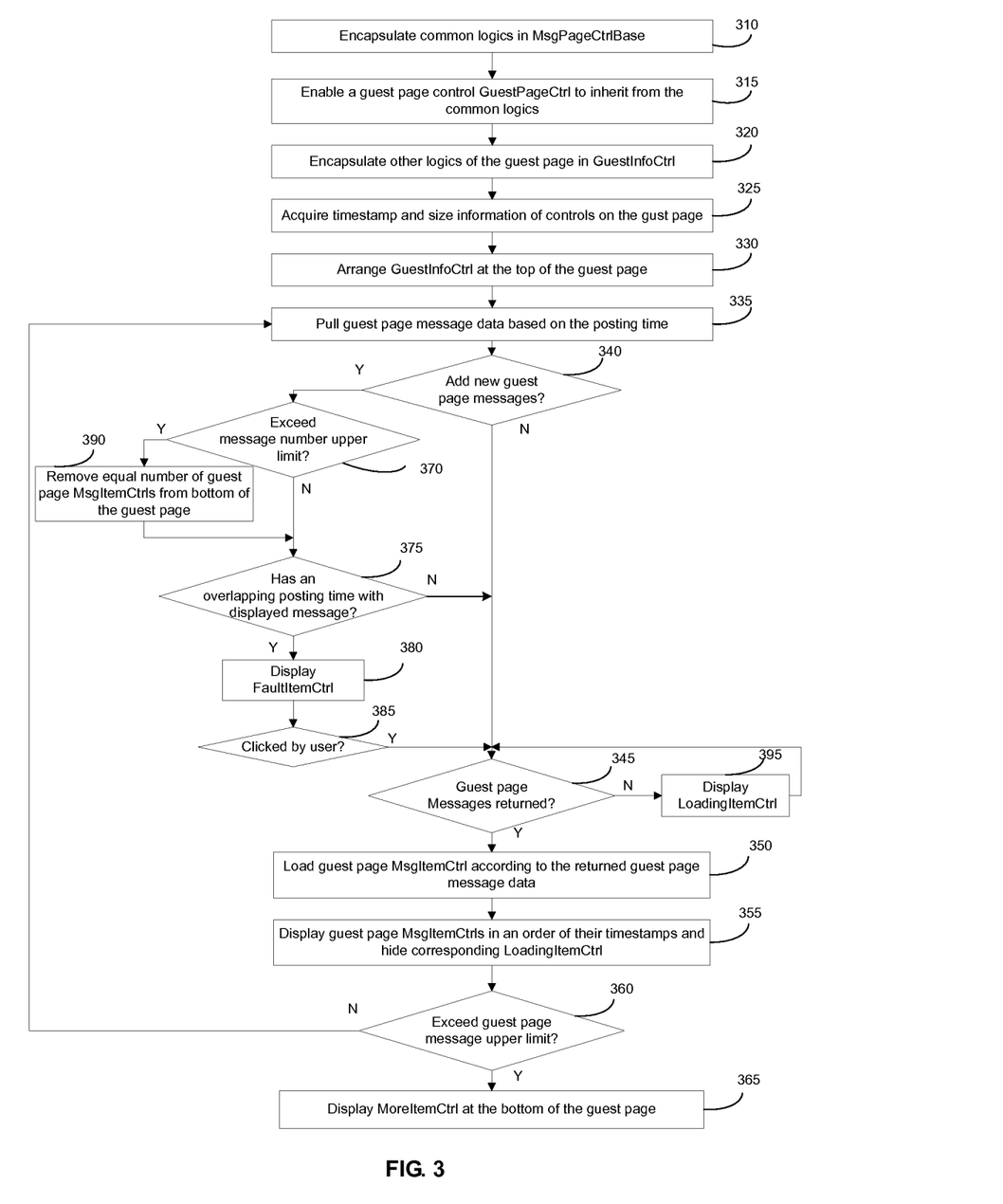
FIG. 3 depicts a schematic flow diagram illustrating an additional exemplary method for implementing a microblog message page in accordance with various disclosed embodiments.

FIG. 3 depicts another exemplary method 300 for implementing a microblog message page in accordance with various disclosed embodiments.

Depending on application scenarios, a microblog message page may include own specific contents. For example, when entering a message page of a certain user, e.g., a guest page having a guest message page control (GuestPageCtrl), the present guest page may include some personal information in additional to the microblog messages this guest has posted. The guest page may then have its own specific control, e.g., guest information control (GuestInfoCtrl), which needs to be inserted into the guest page.

Referring to FIG. 3, according to various embodiments, method 300 for implementing a guest page can include the followings.

In Step 310, common logics of various message pages can be encapsulated in a message page control base (MsgPageCtrlBase). In this example, the message pages include a guest page.

In Step 315, the GuestPageCtrl of a guest page can be enabled to inherit the common logics. The GuestPageCtrl can include or be loaded with guest page MsgItemCtrl, guest page LoadingItemCtrl, guest page MoreItemCtrl, and/or guest page FaultItemCtrl.

In Step 320, other logics of the guest page can be encapsulated in the GuestInfoCtrl. In this example, the GuestPageCtrl can further include or be further loaded with GuestInfoCtrl, which can use, e.g., the above-mentioned OtherItemCtrl. The other logic can thus be used to load the GuestInfoCtrl onto the guest page.

In Step 325, timestamp and size information of controls in the GuestPageCtrl can be acquired. The method 200 shown in FIG. 2 may be used to acquire the timestamp and size information of controls. Or, in certain embodiments, the GuestPageCtrl can obtain GuestInfoCtrl timestamp and size information by using GuestInfoCtrl interface inherited from PageCtrl public interface.

In Step 330, the GuestInfoCtrl can be laid out at the top of the guest page. The GuestInfoCtrl can first be instantiated to display basic information of this microblog guest. Based on the acquired timestamp and size information of the GuestInfoCtrl, the GuestInfoCtrl can be laid out at the top of the guest page. For example, this can be achieved by setting GuestInfoCtrl timestamp as the greatest (or as a maximum).

In Step 335, guest page message data can be pulled according to the message timestamp. In this step, an updating operation can be initiated by microblog message updating logic of the guest page (e.g., GuestPageLogic). For example, the first time when a user enters the guest page, the most recent 30 messages can be pulled based on the guest page message timestamp. While the user enters the guest page for a second time or the guest page receives an update notification from the server, this Step 335 can also be triggered to pull the most recent posted messages after the previous pulling.

In Step 340, whether new guest page messages need to be added is determined. When it is determined that new guest page messages need to be added into the guest page, Step 370 is performed. Otherwise, when it is determined that new guest page messages do not need to be added into the guest page, Step 345 is performed. This is because, at Step 335, guest page messages can be pulled based on message timestamps. If new guest page messages need to be added, faults and other errors may occur including, e.g., non-continuous messages, etc., after pulling the new guest page messages.

In Step 345, whether the guest page messages are returned is determined. When it is determined that guest page messages are not returned promptly, i.e., messages are not promptly pulled, Step 395 is performed. Otherwise, when it is determined that guest page messages are returned, Step 350 is performed. Of course, in various embodiments, Steps 345 and 395 can be omitted and Step 350 can be directly performed.

In Step 350, guest page MsgItemCtrl can be loaded according to the returned guest page message data. At this step, after the messages are returned by pulling, the guest page MsgItemCtrl can be loaded based on the returned message data.

In Step 355, the guest page MsgItemCtrls can be displayed according to the order of their timestamps. Corresponding guest page LoadingItemCtrl can be hidden. For example, after the messages are returned by pulling, guest page MsgItemCtrls can be: inserted into the guest page; sorted and laid out according to timestamp and size information of the MsgItemCtrls; and displayed on the guest page. Meanwhile, the guest page LoadingItemCtrl can be hidden. For example, the most recent guest page MsgItemCtrl can be sequentially sorted following the GuestInfoCtrl.

In Step 360, it is determined whether the upper limit of the number of guest page messages is reached. When it is determined that the upper limit is not reached, Step 335 to Step 355 can be repeatedly performed, until the number of the loaded guest page MsgItemCtrl exceeds the upper limit for the guest page messages. On the other hand, when it is determined that the upper limit is exceeded, Step 365 is performed.

In various embodiments, the number of the posted messages of present user may be greater than 30. History (or "old") messages may be stored on the server without being pulled out. When the user browses messages from the top to the bottom and reaches the last message displayed on the message page, an update operation can be triggered to pull another 30 messages having a timestamp earlier than the last message. Before the messages are returned, at the bottom of the message page (i.e., below the last message), LoadingItemCtrl can be prompted to the user. After the messages are returned by pulling, handling logics can be used to process the messages, similar to Step 350 and Step 355.

In Step 365, a MoreItemCtrl can be displayed at the bottom of the guest message page. If the number of the loaded guest page MsgItemCtrl exceeds the upper limit of the guest page messages, a guest page MoreItemCtrl can be displayed at the bottom of guest page. In other words, if the user repeats Step 335 to Step 360, the number of messages on the message page may exceed the upper limit and the MoreItemCtrl can be displayed at the bottom of the page without triggering the pulling operation of the history messages. That is, after upper limit is reached, the history messages will not be pulled. As disclosed herein, the guest MoreItemCtrl may be a prompt and/or a picture used to indicate un-displayed messages.

In Step 370, whether the guest page message upper limit is exceeded or not can be determined. When the upper limit is exceeded, Step 390 is performed. When the upper limit is not exceeded, then Step 375 is performed.

In Step 375, it is determined whether a newly pulled guest page message has a timestamp overlapping with a timestamp of an already displayed message. The timestamp overlapping of the newly pulled guest page message and the already displayed message can be checked to determine a fault condition. For example, if there is no overlapping, a fault condition may occur and Step 380 can be performed. Otherwise, if there is no fault, i.e., there is overlapping, Step 345 is performed.

In Step 380, a corresponding guest page FaultItemCtrl can be displayed. If the newly pulled guest page message and the already displayed local message have no overlapping on their timestamps, a FaultItemCtrl can be inserted following the newly pulled guest page message. For example, the FaultItemCtrl timestamp can be set to a value by subtracting one (i.e., 1) from the timestamp of the message presented thereabove.

In Step 385, when the user clicks on a corresponding guest page FaultItemCtrl, Step 345 is performed to load a predetermined number of guest page message controls whose timestamps are earlier than the FaultItemCtrl's timestamp. For example, a user can click on a guest page FaultItemCtrl to trigger a loading of about 30 messages with timestamps earlier than the FaultItemCtrl. On the other hand, if the user does not click on the FaultItemCtrl, only the guest page FaultItemCtrl can be displayed. Of course, in various embodiments, Step 375 to Step 385 can be omitted as desired.

In Step 390, a number of guest page MsgItemCtrls can be removed or deleted from the bottom of the guest message page. When new messages need to be added to a message page and the total number of the loaded guest page MsgItemCtrl exceeds the upper limit of the number of the guest page messages, a number of guest page MsgItemCtrls can be removed from the bottom of the guest message page. This number can be equal to the exceeded number of the guest page MsgItemCtrls. Then, at Step 375, more guest page MsgItemCtrls corresponding to the newly added gust page messages can be added to the guest page.

In Step 395, a corresponding guest page LoadingItemCtrl can be displayed. That is, before the message is returned, a LoadingItemCtrl may be displayed on the message page to prompt the user that the guest page is loading messages.

According to another embodiment, the size of controls may include width of the controls. The controls may include, for example, OtherItemCtrl, at least one MsgItemCtrl, at least one LoadingItemCtrl, at least one FaultItemCtrl, and/or MoreItemCtrl. These controls can have the same width and can be sorted based on their timestamps and be laid out from top to bottom on the message page, e.g., in a descending or ascending order.

Figure 4:
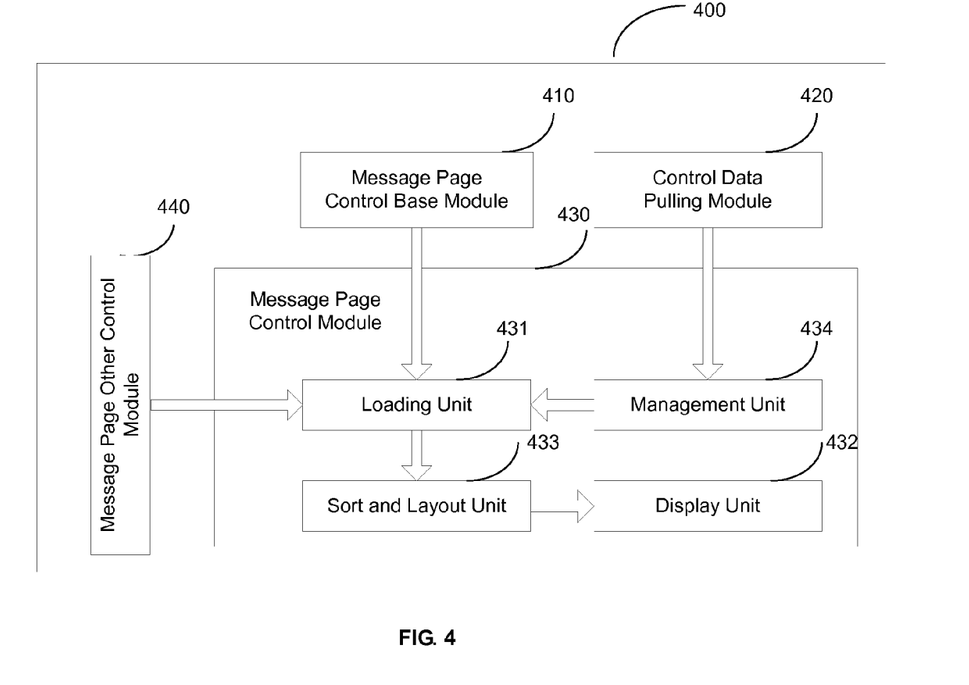
FIG. 4 depicts an exemplary apparatus for implementing a microblog message pages in accordance with various disclosed embodiments.

FIG. 4 depicts an exemplary apparatus 400 for implementing a microblog message in accordance with various disclosed embodiments. Referring to FIG. 4, the apparatus 400 can include, for example, a message page control base module 410, a control data pulling module 420, and a message page control module 430. Other modules may also be included.

The message page control base module 410 can be configured to encapsulate common logics of various message pages into a message page control base (MsgPageCtrlBase). The control data pulling module 420 can be configured to pull content data of a message page control (PageCtrl) of one of various message pages.

The message page control module 430 can be configured to enable the message page control (PageCtrl) of the one message page of the plurality of message pages to inherit from the common logics encapsulated in the message page control base (MsgPageCtrlBase) and to execute the common logics. The message page control module 430 can include a loading unit 431 configured to load the message page control (PageCtrl) of the one message page of the plurality of message pages based on the pulled content data. The message page control module 430 can further include a display unit 432 configured to display the message page control (PageCtrl) of the one message page of the plurality of message pages onto the one message page.

In another embodiment, the apparatus 400 may further include a message page other control module 440 configured to encapsulate other logics of the one message page of the plurality of message pages in OtherItemCtrl of the one message page.

In another embodiment, the message page control module 430 may further include a management unit 434 configured to encapsulate appropriate management logics into corresponding management controls. PageCtrl can use an appropriate management control to manage all ItemCtrls contained in the PageCtrl including, e.g., at least one MsgItemCtrl, at least one LoadingItemCtrl, at least one FaultItemCtrl, or a combination thereof.

The message page control module 430 may further include a sorting and layout management unit 433 configured to acquire timestamp and size information of ItemCtrls contained in the PageCtrl by a public interface of the PageCtrl. The sorting and layout management unit 433 can also be configured to sort and manage layout of the ItemCtrls contained in the PageCtrl, based on the timestamp and the size information.

Therefore, the content data presented by PageCtrl can be retrieved from a server, and the message page can be displayed on a monitor. Further, message page interface hierarchical structures and class structures are described to further illustrate the disclosed apparatus and its functions.

Figure 5A:
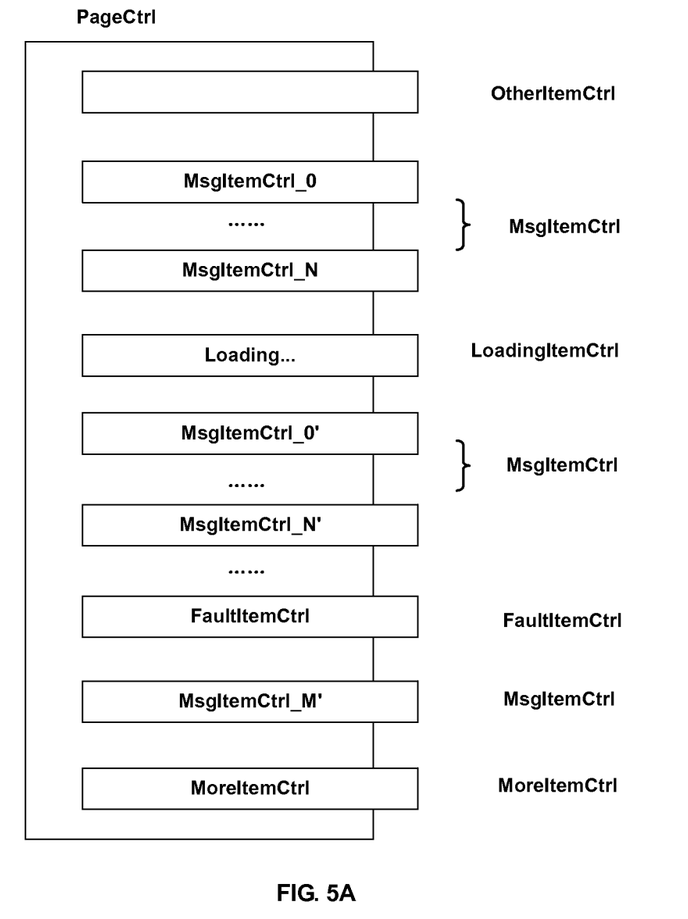
FIGS. 5A-5B depict an interface hierarchical structure and a class structure for implementing a microblog message page in accordance with various disclosed embodiments.
Figure 5B:
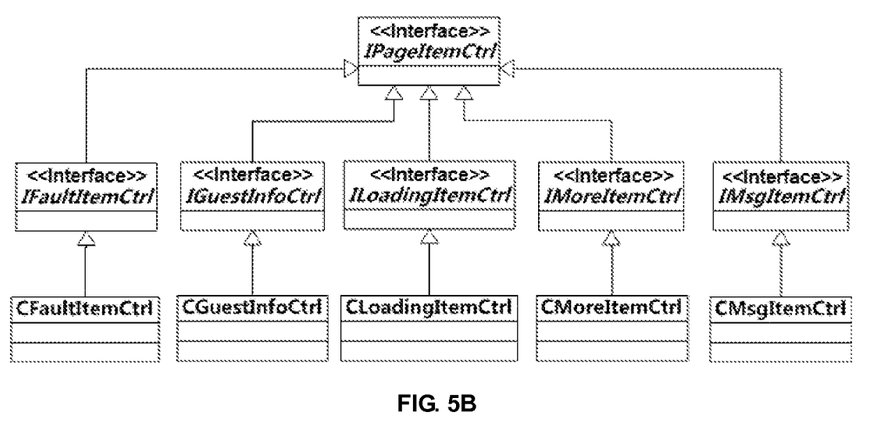
Figure 6A:
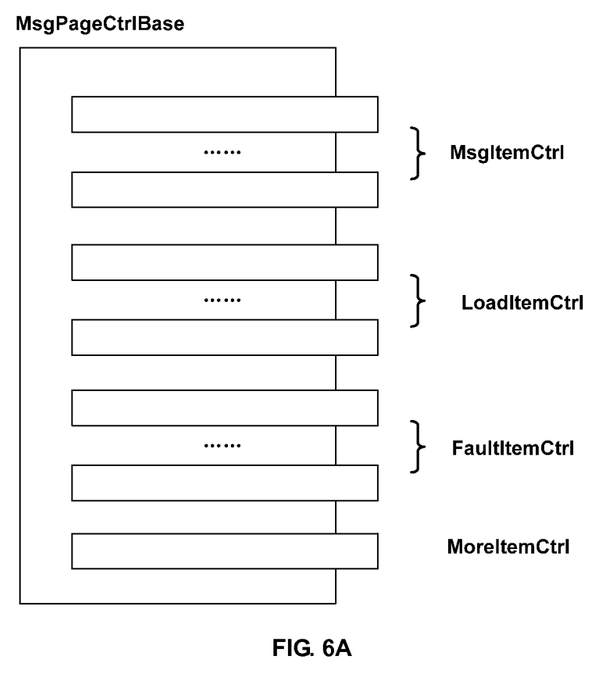
FIGS. 6A-6C depict an interface hierarchical structure and a class structure for implementing a microblog base message page in accordance with various disclosed embodiments.
Figure 6B:
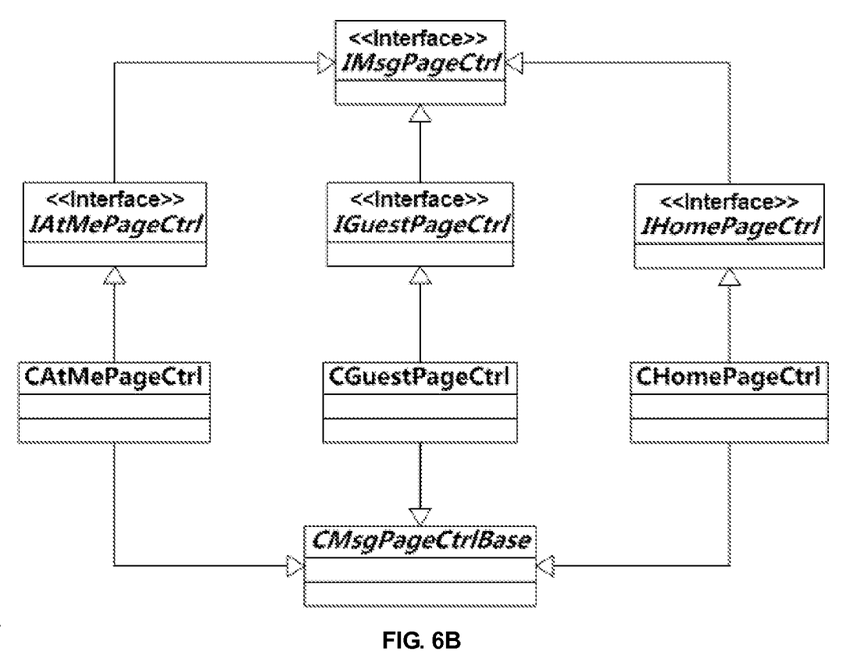
Figure 6C:
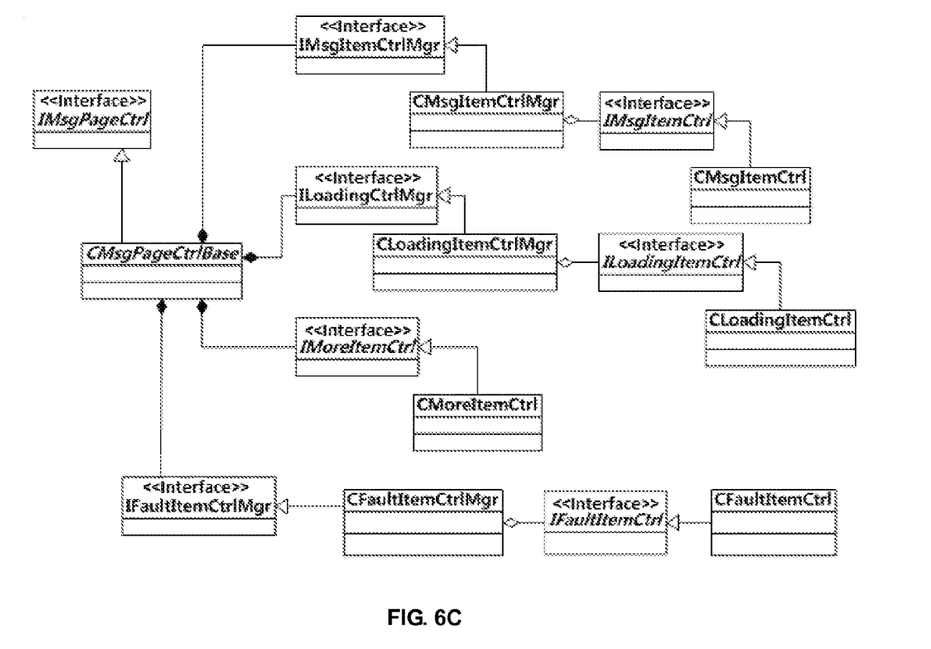
Figure 7:
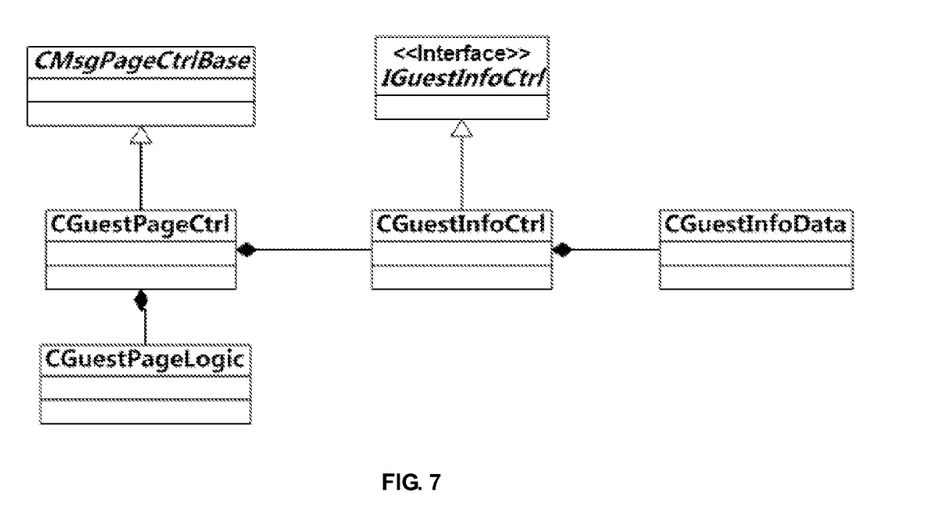
FIG. 7 depicts a class structure for implementing a microblog message page in accordance with various disclosed embodiments.

FIGS. 5A-5B depict a microblog message page interface hierarchical structure and a class structure for implementing microblog message page. FIGS. 6A-6C depict a microblog base message page interface hierarchical structure and class structures for implementing microblog message page control base in accordance with various disclosed embodiments. FIG. 7 depicts a class structure for implementing microblog message page in accordance with various disclosed embodiments.

In these figures, hollow triangle arrows are used to indicate an inheritance relationship. For example, in FIG. 5B, IFaultItemCtrl can inherit from IPageItemCtrl. Further, filled diamond-shaped arrows are used to indicate a one-to-one inclusion relationship. For example, in FIG. 6C, a CMsgPageCtrlBase object can include an object which implements IMsgItemCtrlMgr interface. In addition, hollow diamond-shaped arrows are used to indicate a one-to-many inclusion relationship. For example, in FIG. 6C, one CMsgItemCtrlMgr object can include many objects which implement IMsgItemCtrl interface.

Referring to FIG. 5A, microblog PageCtrl can be a container and responsible for loading, sorting, and managing layout of all kinds of ItemCtrls. Accordingly, PageCtrl may need information from ItemCtrl including timestamp information for sorting and size information for managing layout.

In an example of a guest page, guest page PageCtrl can include or be loaded with at least one MsgItemCtrl, at least one LoadingItemCtrl, at least one FaultItemCtrl, MoreItemCtrl and/or GuestInfoCtrl.

Referring to FIG. 5B, still using the example of the guest page, various types of ItemCtrls loaded by the PageCtrl can be implemented by classes illustrated in FIG. 5B. For example, class CFaultItemCtrl corresponds to FaultItemCtrl; class CGuestInfoCtrl corresponds to guest page GuestInfoCtrl; class CLoadingItemCtrl corresponds to LoadingItemCtrl; class CMoreItemCtrl corresponds to MoreItemCtrl; and class CMsgItemCtrl corresponds to MsgItemCtrl.

In order to obtain sorting and layout information of various types of ItemCtrls, a common interface, e.g., the public interface IPageItemCtrl, can be abstracted from all the ItemCtrls when implementing the guest page. IPageItemCtrl can provide methods for the PageCtrl to acquire timestamp and size information for each ItemCtrl.

In another embodiment, the sorting and layout management unit 433 can also be configured to acquire timestamp and size information of, for example, at least one MsgItemCtrl, at least one LoadingItemCtrl, at least one FaultItemCtrl and/or MoreItemCtrl by the IPageItemCtrl interface. The sorting and layout management unit 433 can further be configured to sort and manage layout of these ItemCtrls according to their timestamp and size information.

The message page other control module 440 can be configured to encapsulate other logics (e.g., guest profile related logics) of the guest page in GuestInfoCtrl; and to insert the GuestInfoCtrl into MsgItemCtrls. The message page control module 430 can load the GuestInfoCtrl onto the guest page according to the guest profile related logic. In addition, the sorting and layout management unit 433 can acquire timestamp and size information of the at least one MsgItemCtrl, at least one LoadingItemCtrl, at least one FaultItemCtrl, MoreItemCtrl and/or GuestInfoCtrl by the IPageItemCtrl interface. The sorting and layout management unit 433 can further conduct sorting and manage layout of these ItemCtrls according to their timestamp and size information.

GuestInfoCtrl can be set to have the greatest timestamp; MoreItemCtrl can be set to have the least timestamp; while MsgItemCtrl can be set that the more recent the message is posted, the greater number the timestamp has. Timestamps of LoadingItemCtrl and/or FaultItemCtrl can be determined by an adjacent ItemCtrl. For example, the timestamp of a LoadingItemCtrl can be set to be a value by subtracting one from the timestamp of the MsgItemCtrl presented there-above. Because GuestInfoCtrl has the greatest timestamp, GuestInfoCtrl can always be laid out at the top of guest page. To the contrary, MoreItemCtrl can be laid out at the bottom of guest page.

FIG. 6A depicts an object structure diagram of a microblog MsgPageCtrlBase. To facilitate the expansion of various message pages, common logics of various message pages can be encapsulated in MsgPageCtrlBase by the message page control base module 410. In this manner, various message pages under different scenarios may only need to inherit from MsgPageCtrlBase to reuse the common logic(s).

FIG. 6B depicts the inheritance relationship between PageCtrl of various message pages and MsgPageCtrlBase. The message page control module 430 can enable PageCtrl to inherit from common logic. PageCtrl can have all functionalities of the MsgPageCtrlBase through this inheritance. In addition, the public interface of the message pages (IMsgPageCtrl), abstracted from various message pages, can be used to call the message pages. The class structure of FIG. 6C clearly illustrates that PageCtrl can be used as a container of ItemCtrls.

The management unit 434 can be configured to encapsulate appropriate management logics into corresponding management controls. PageCtrl can respectively manage at least one MsgItemCtrl, at least one LoadingItemCtrl, and/or at least one FaultItemCtrl by corresponding management controls.

Referring to FIG. 6C, class CMoreItemCtrl corresponds to MoreItemCtrl. When a message page has only one MoreItemCtrl, the operation logic can be relatively simple. The corresponding source code can therefore be directly placed in CMsgPageCtrlBase. Class CFaultItemCtrl corresponds to FaultItemCtrl. In a logic design, multiple faults may occur on a message page. FaultIemCtrlMgr can then be encapsulated to manage the FaultItemCtrl. CLoadingItemCtrl corresponds to LoadingItemCtrl.

Currently, three types of LoadingItemCtrls may be displayed on message pages and may include, for example, (1) a LoadingItemCtrl displayed at the top of the page, when a user logs in for the first time to trigger a new message pulling operation; (2) a LoadingItemCtrl displayed at the bottom of the page, when a user scrolls down using the scrolling bar to trigger an old message pulling operation; and (3) a LoadingItemCtrl displayed before completion of pulling a fault message, when a user clicks on FaultItemCtrl to trigger a message pulling operation.

The above-mentioned three types of LoadingItemCtrls may be displayed at the same time and the handling logic can be very complex. For this reason, class CLoadingItemCtrlMgr can be introduced between CLoadingItemCtrl and CMsgPageCtrlBase to manage the handling logic of LoadingItemCtrls and to simplify the handling logic of CMsgPageCtrlBase of LoadingItemCtrls. CMsgItemCtrl corresponds to MsgItemCtrl. The handling logic may be more complex. Therefore, CMsgItemCtrlMgr can be used.

The CMsgItemCtrlMgr can be used to analyze message data in a one-by-one fashion, after a batch of pulled message data is returned. The CMsgItemCtrlMgr can be used to instantiate a corresponding MsgItemCtrl, i.e., a CMsgItemCtrl object, and to insert the MsgItemCtrl into the message page. In addition, when a message page receives a server notification that a message has been deleted, CMsgItemCtrlMgr can locate and delete the corresponding CMsgItemCtrl object from the page.

In another embodiment, the size of the controls may include width of the controls. The controls may include, e.g., OtherItemCtrl, at least one MsgItemCtrl, at least one LoadingItemCtrl, at least one FaultItemCtrl, and/or MoreItemCtrl, which may have the same width. The sorting and layout management unit 433 can enable PageCtrl to sort and lay out the GuestInfoCtrl, at least one MsgItemCtrl, at least one LoadingItemCtr, at least one FaultItemCtrl, and/or MoreItemCtrl from the top to the bottom on the message page based on their timestamps in a descending (or ascending) order. Of course, various embodiments are not limited to the above examples.

FIG. 7 depicts an exemplary guest page. In FIG. 7, IGuestInfoCtrl can inherit from IPageItemCtrl to satisfy requirements for sorting and layout management of GuestInfoCtrl by the guest page. Guest page can be used to display microblog messages posted by a guest, while CGuestInfoCtrl can be configured to display profile information of the guest (including, for example, gender, birthplace, audience number, broadcasting number, etc.). CGuestInfoCtrl can be a guest page-specific control and can be sorted together with other controls on the guest page.

In addition, the guest profile can usually include more fields. The logics related to the guest profile, for example, for pulling data, triggering update, and responding to the update can be complicated. The implementation of these logics can be encapsulated in class CGuestPageLogic. The guest profile information can be aggregated and encapsulated in class CGuestInfoData.

As such, the technical solutions disclosed herein can effectively improve message page expandability. New message pages can be easily added, developed, and managed by a unified management class. Expandability and maintainability of the code architecture can be highly improved. Development efficiency can also be highly improved. In addition, since the sorting is only based on timestamps of various types of controls on the message page, simple sorting algorithms can be used with high efficiency.

Other applications, advantages, alternations, modifications, or equivalents to the disclosed embodiments are obvious to those skilled in the art.

What is claimed is:

1. A method for implementing a microblog message page comprising:

encapsulating a common logic of a plurality of types of message pages in a message page control base for a microblog, wherein the plurality of types of message pages include a home page, a guest page, and an @ message page of the microblog, each type of message pages being able to reuse the same common logic;

pulling content data of a message page control of one of the plurality of types of message pages, wherein the message page control is a container to contain a plurality of types of controls;

enabling the message page control of the one of the plurality of types of message pages to inherit from the common logic encapsulated in the message page control base; and executing the common logic, based on the pulled content data of the message page control containing the plurality of types of controls of one of the plurality of types of message pages, to load the message page control of the one of the plurality of types of message pages and to display the plurality of types of controls contained in the message page control on the one of the plurality of types of message pages;

wherein the plurality of types of controls contained in the message page control of the one of the plurality of types of message pages includes one or more of: at least one message item control, at least one loading item control, at least one fault item control, and a more item control;

the method further including: encapsulating other logics of the one of the plurality of types of message pages into an other item control of the one of the plurality of types of message pages, according to the other logics, to load the other item control of the one of the plurality of types of message pages and to display the other item control on the one of the plurality of types of message pages, wherein executing the common logic further includes:

acquiring timestamp and size information of the one or more of the at least one message item control, the at least one loading item control, the at least one fault item control, the more item control, and the other item control by a public interface of the message page control; and sorting and managing layout of the one or more of the at least one message item control, the at least one loading item control, the at least one fault item control, the more item control, and the other item control, based on the timestamp and the size information;

wherein the one of the plurality of types of message pages is the guest page and the other item control includes a guest info control, wherein the acquiring of the timestamp and the size information of the other item control by the public interface of the message page control includes:

acquiring timestamp and size information of the guest info control by using an interface of the guest info control that inherits from the public interface of the message page control;

wherein the sorting and managing layout of the other item control according to the acquired timestamp and size information includes:

arranging the guest info control at top of the guest page according to the acquired timestamp and size information of the guest info control;

wherein the at least one loading item control includes at least one guest page loading item control, and the at least one message item control includes at least one guest page message item control;

wherein the pulling of the content data of the message page control of the one of the plurality of types of message pages includes pulling guest page message data; and wherein the loading and displaying of the message page control of the one of the plurality of types of message pages includes:

displaying a corresponding guest page loading item control, before the guest page message data is returned; and after the guest page message data is returned, according to the returned guest page message data, loading the at least one guest page message item control and displaying the at least one guest page message item control by an order of timestamp, and hiding a corresponding guest page loading item control; and wherein the at least one fault item control is at least one guest page fault item control, the method further including:

when a newly posted guest page message needs to be added to the guest page, repeat executing loading and displaying the message page control of the one of the plurality of types of message pages, and if there is no posting time overlapping between the loaded newly posted guest page message and an already displayed guest page message, displaying a corresponding guest page fault item control, wherein a timestamp of the corresponding guest page fault item control equals to a timestamp of an above-posted guest page message item control subtracted by one.

2. The method of claim 1, wherein the executing of the common logic including:

acquiring timestamp and size information of the one or more of the at least one message item control, the at least one loading item control, the at least one fault item control, and the more item control, by a public interface of the message page control of the one of the plurality of types of message pages, and sorting and managing layout of the one or more of the at least one message item control, the at least one loading item control, the at least one fault item control, and the more item control, based on the timestamp and the size information.

3. The method of claim 1, wherein the other item control has a maximum timestamp; the more item control has a minimum timestamp; the more recent a message posting time displayed by the at least one message item control, the greater a timestamp of the at least one message item control; and a timestamp of the at least one loading item control and the at least one fault item control is determined by a timestamp of a message item control adjacent to the at least one loading item control and the at least one fault item control.

4. The method of claim 1, further including:

encapsulating management logics into a corresponding management control, wherein the message page control manages, respectively through the corresponding management control, the at least one message item control, the at least one loading item control, the at least one fault item control, or a combination thereof.

5. The method of claim 1, further including: repeatedly executing the loading and displaying of the message page control of the one of the plurality of types of message pages, until a number of the loaded message item control exceeds an upper limit of guest page message number, wherein the more item control is a guest page more item control, and, if the number of loaded message item control exceeds the upper limit of the guest page message number, the guest page more item control is displayed at the bottom of the guest page.

6. The method of claim 1, further including, if the number of loaded guest page message item control exceeds the upper limit of the guest page message number, removing a number of the guest page message item control form the bottom of the guest page, and adding a guest page message item control corresponding to the new guest page messages to the guest page; and loading a pre-determined number of guest page message item controls having a timestamp earlier than the timestamp of the corresponding guest page fault item control, after the guest page fault item control is clicked on.

7. The method of claim 1, wherein the size information includes width, and the other item control, the at least one message item control, the at least one loading item control, the at least one fault item control, and the more item control, have equal width and are sorted according to an order of the timestamps and arranged on the message page from a top to a bottom.

8. An apparatus for implementing a microblog message page comprising:

a message page control base module configured to encapsulate a common logic of a plurality of types of message pages into a message page control base for a microblog, wherein the plurality of types of message pages include a home page, a guest page, and an @ message page of the microblog, each type of message pages being able to reuse the same common logic;

a control data pulling module configured to pull a content data of a message page control of one of the plurality of types of message pages, wherein the message page control is a container to contain a plurality of types of controls; and a message page control module configured to enable the message page control of the one of the plurality of types of message pages to inherit from the common logic encapsulated in the message page control base and to execute the common logic based on the pulled content data of the message page control containing the plurality of types of controls of one of the plurality of types of message pages, wherein the message page control module includes a loading unit configured to load the message page control of the one of the plurality of types of message pages based on the pulled content data; and a display unit configured to display the message page control of the one of the plurality of types of message pages onto the one of the plurality of types of message pages;

wherein the message page control of the one of the plurality of types of message pages includes one or more of at least one message item control, at least one loading item control, at least one fault item control, and a more item control;

wherein the apparatus further including a message page other control module configured to encapsulate other logics of the one of the plurality of types of message pages into an other item control of the one of the plurality of types of message pages, wherein the message page control module further includes: a sorting and layout management unit configured to acquire timestamp and size information of the one or more of the at least one message item control, the at least one loading item control, the at least one fault item control, the more item control, and the other item control by a public interface of the message page control of the one of the plurality of types of message pages, and configured to sort and manage layout of the one or more of the at least one message item control, the at least one loading item control, the at least one fault item control, the more item control, and the other item control, based on the timestamp and the size information;

wherein the one of the plurality of types of message pages is the guest page and the other item control includes a guest info control, wherein the acquiring of the timestamp and the size information of the other item control by the public interface of the message page control includes:

acquiring timestamp and size information of the guest info control by using an interface of the guest info control that inherits from the public interface of the message page control;

wherein the sorting and managing layout of the other item control according to the acquired timestamp and size information includes:

arranging the guest info control at top of the guest page according to the acquired timestamp and size information of the guest info control;

wherein the at least one loading item control includes at least one guest page loading item control, and the at least one message item control includes at least one guest page message item control;

wherein the pulling of the content data of the message page control of the one of the plurality of types of message pages includes pulling guest page message data; and wherein the loading and displaying of the message page control of the one of the plurality of types of message pages includes:

displaying a corresponding guest page loading item control, before the guest page message data is returned; and after the guest page message data is returned, according to the returned guest page message data, loading the at least one guest page message item control and displaying the at least one guest page message item control by an order of timestamp, and hiding a corresponding guest page loading item control; and wherein the at least one fault item control is at least one guest page fault item control, the method further including:

when a newly posted guest page message needs to be added to the guest page, repeat executing loading and displaying the message page control of the one of the plurality of types of message pages, and if there is no posting time overlapping between the loaded newly posted guest page message and an already displayed guest page message, displaying a corresponding guest page fault item control, wherein a timestamp of the corresponding guest page fault item control equals to a timestamp of an above-posted guest page message item control subtracted by one.

9. The apparatus of claim 8, wherein the message page control module further includes a sorting and layout management unit configured to acquire timestamp and size information of the one or more of the at least one message item control, the at least one loading item control, the at least one fault item control, and the more item control by a public interface of the message page control of the one of the plurality of types of message pages, and configured to sort and manage layout of the at least one message item control, the at least one loading item control, the at least one fault item control, and the more item control based on the timestamp and the size information.

10. The apparatus of claim 8, wherein the other item control has a maximum timestamp; the more item control has a minimum timestamp; the more recent a message posting time displayed by the at least one message item control, the greater a timestamp of the at least one message item control; and a timestamp of the at least one loading item control and the at least one fault item control is determined by a timestamp of a message item control adjacent to the at least one loading item control and the at least one fault item control.

11. The apparatus of claim 8, wherein the message page control module further includes a management unit configured to encapsulate management logics into a corresponding management control, wherein the message page control manages, respectively through the corresponding management control, the one or more of the at least one message item control, the at least one loading item control, and the at least one fault item control.

\* \* \* \* \*